United States Patent
Kruse et al.

(10) Patent No.: US 10,909,978 B2
(45) Date of Patent: Feb. 2, 2021

(54) SECURE UTTERANCE STORAGE

(71) Applicant: Amazon Technologies, Inc., Seattle, WA (US)

(72) Inventors: William Frederick Hingle Kruse, Seattle, WA (US); Peter Turk, Seattle, WA (US); Panagiotis Thomas, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 15/635,936

(22) Filed: Jun. 28, 2017

(65) Prior Publication Data
US 2019/0005952 A1  Jan. 3, 2019

(51) Int. Cl.
G10L 21/00 (2013.01)
G10L 15/00 (2013.01)
(Continued)

(52) U.S. Cl.
CPC ............ G10L 15/22 (2013.01); G06F 3/0623 (2013.01); G06F 3/0659 (2013.01); G06F 3/0673 (2013.01); G06F 21/32 (2013.01); G06F 21/60 (2013.01); G06F 21/6245 (2013.01); G06F 21/6254 (2013.01); G10L 13/00 (2013.01); G10L 13/08 (2013.01); G10L 15/02 (2013.01); G10L 15/26 (2013.01); G10L 21/003 (2013.01);
(Continued)

(58) Field of Classification Search
CPC ..... G10L 13/00; G10L 13/033; G10L 21/003; G10L 2021/0135; G06F 21/6245; G06F 21/602; H04W 12/02
See application file for complete search history.

(56) References Cited

U.S. PATENT DOCUMENTS 5,113,449 A * 5/1992 Blanton ................ G10L 13/033
                                                            704/261
5,911,129 A  6/1999 Towell
(Continued)

OTHER PUBLICATIONS

Arawjo, et. al., "TypeTalker: A Speech Synthesis-Based Multi-Modal Commenting System", Proceedings of the 2017 ACM Conference on Computer Supported Cooperative Work and Social Computing, ACM, Feb. 25, 2017, pp. 1970-1981.
(Continued)

Primary Examiner — Olujimi A Adesanya
(74) Attorney, Agent, or Firm — Lee & Hayes, P.C.

(57) ABSTRACT

Technologies for secure storage of utterances are disclosed. A computing device captures audio of a human making a verbal utterance. The utterance is provided to a speech-to-text (STT) service that translates the utterance to text. The STT service can also identify various speaker-specific attributes in the utterance. The text and attributes are provided to a text-to-speech (TTS) service that creates speech from the text and a subset of the attributes. The speech is stored in a data store that is less secure than that required for storing the original utterance. The original utterance can then be discarded. The STT service can also translate the speech generated by the TTS service to text. The text generated by the STT service from the speech and the text generated by the STT service from the original utterance are then compared. If the text does not match, the original utterance can be retained.

20 Claims, 8 Drawing Sheets

(51) Int. Cl.
*G10L 15/26* (2006.01)
*G10L 15/22* (2006.01)
*G10L 21/003* (2013.01)
*G06F 21/60* (2013.01)
*G06F 21/62* (2013.01)
*H04M 3/42* (2006.01)
*G06F 21/32* (2013.01)
*G10L 13/00* (2006.01)
*G06F 3/06* (2006.01)
*G10L 13/08* (2013.01)
*G10L 15/02* (2006.01)
*G10L 25/51* (2013.01)
*G10L 21/013* (2013.01)

(52) U.S. Cl.
CPC ......... *G10L 25/51* (2013.01); *H04M 3/42008* (2013.01); *H04M 3/42221* (2013.01); *G10L 2021/0135* (2013.01); *H04M 2203/6009* (2013.01)

(56) References Cited

U.S. PATENT DOCUMENTS

| | | | | |
|---|---|---|---|---|
| 6,181,780 | B1* | 1/2001 | Finnigan | H04M 3/533 379/67.1 |
| 6,404,872 | B1* | 6/2002 | Goldberg | H04M 3/40 379/201.02 |
| 7,831,420 | B2* | 11/2010 | Sinder | G10L 21/003 704/200 |
| 8,473,451 | B1* | 6/2013 | Hakkani-Tur | G06F 21/00 707/602 |
| 8,843,373 | B1* | 9/2014 | Allen | G10L 21/00 370/377 |
| 9,058,813 | B1* | 6/2015 | Blanksteen | G10L 15/19 |
| 9,531,854 | B1* | 12/2016 | Bort | H04M 1/65 |
| 10,573,312 | B1* | 2/2020 | Thomson | G10L 15/30 |
| 2004/0215451 | A1* | 10/2004 | Macleod | G10L 13/00 704/231 |
| 2005/0071161 | A1* | 3/2005 | Shen | G10L 15/22 704/236 |
| 2006/0028488 | A1* | 2/2006 | Gabay | H04L 29/06027 345/626 |
| 2006/0095265 | A1* | 5/2006 | Chu | G10L 13/033 704/268 |
| 2006/0190263 | A1* | 8/2006 | Finke | G06Q 50/22 704/270 |
| 2006/0247919 | A1* | 11/2006 | Specht | G10L 21/06 704/201 |
| 2006/0274856 | A1* | 12/2006 | Dunn | H04K 1/00 375/316 |
| 2007/0203698 | A1* | 8/2007 | Mapes-Riordan | G10L 21/06 704/231 |
| 2007/0244700 | A1 | 10/2007 | Kahn et al. | |
| 2008/0037719 | A1* | 2/2008 | Doren | G10L 21/00 379/85 |
| 2008/0118150 | A1* | 5/2008 | Balakrishnan | G06F 40/157 382/176 |
| 2008/0208579 | A1* | 8/2008 | Weiss | G06Q 30/02 704/244 |
| 2008/0221882 | A1* | 9/2008 | Bundock | G10L 15/26 704/235 |
| 2009/0006096 | A1* | 1/2009 | Li | G10L 13/08 704/260 |
| 2010/0082342 | A1* | 4/2010 | Erhart | G10L 21/045 704/246 |
| 2011/0218798 | A1* | 9/2011 | Gavalda | G10L 17/00 704/201 |
| 2012/0095765 | A1* | 4/2012 | Bodin | G10L 15/22 704/251 |
| 2013/0266127 | A1* | 10/2013 | Schachter | G10L 25/48 379/88.01 |
| 2014/0129226 | A1* | 5/2014 | Lee | G10L 15/04 704/254 |
| 2014/0278426 | A1* | 9/2014 | Jost | G10L 15/063 704/257 |
| 2015/0195406 | A1* | 7/2015 | Dwyer | H04M 3/5175 379/265.07 |
| 2015/0317977 | A1* | 11/2015 | Manjunath | G10L 17/00 704/270 |
| 2016/0071510 | A1* | 3/2016 | Li | G10L 13/027 704/260 |
| 2017/0221471 | A1* | 8/2017 | Sharifi | G10L 13/043 |
| 2017/0357390 | A1* | 12/2017 | Alonso Ruiz | G06F 3/0488 |
| 2019/0180759 | A1* | 6/2019 | Fontaine | G10L 13/00 |

OTHER PUBLICATIONS

Cunningham, "Protecting Privacy in Recorded Conversations", Retrieved on Aug. 9, 2018, from <<URL:https://media.proquest.com/media/pq/classic/doc/1414135101/fmt/ai/rep/NPDF?cit:auth=Cunningham,+Scot&cit:title=Protecting+privacy+in+recorded+conversations&cit:pub=ProQuest+Dissertations+and+Theses&cit:vol=&cit:iss=&cit:pg=&cit:date=2007&ic=true&cit:prod=ProQuest+Dissertations+&+Theses+Global:+The+S>>, Jan. 2007, 100 pages.

Justin, et. al., "Speaker De-identification using Diphone Recognition and Speech Synthesis", 2015 11th IEEE International Conference and Workshops on Automatic Face and Gesture Recognition (FG), IEEE, May 4-8, 2015, 7 pages.

Justin, et. al., "Intelligibility Assessment of the De-Identified Speech Obtained Using Phoneme Recognition and Speech Synthesis Systems", Medical Image Computing and Computer-Assisted Intervention—MICCAI, Springer International Publishing, Sep. 8, 2014, pp. 529-536.

The PCT Search Report and Written Opinion dated Aug. 24, 2018, for PCT Application No. PCT/US18/37357, 17 pages.

Ribaric, at. al., "De-identification for privacy protection in multimedia content: A survey", Signal Processing Image communication, Elsevier Science Publishers, vol. 47, Jun. 2016, pp. 131-151.

* cited by examiner

SECURE UTTERANCE STORAGE

BACKGROUND

Voice-driven computing systems are widely used. These computing systems typically receive a recording of a user's voice, commonly referred to as an "utterance." Voice recognition can be applied to the utterance to determine if the user has requested to perform a command, has requested information, or has requested that another type of action be performed. In many systems, the original recording of the utterance is saved for future use. However, because such a recording can have attributes from which personally identifiable information can be derived, such as the user's age or gender, these recordings are typically stored using a high level of security. Storing such recordings with a high level of security can, however, utilize significant computing resources, such as processor cycles, memory, and storage space.

The disclosure made herein is presented with respect to these and other considerations.

DETAILED DESCRIPTION

Figure 1:
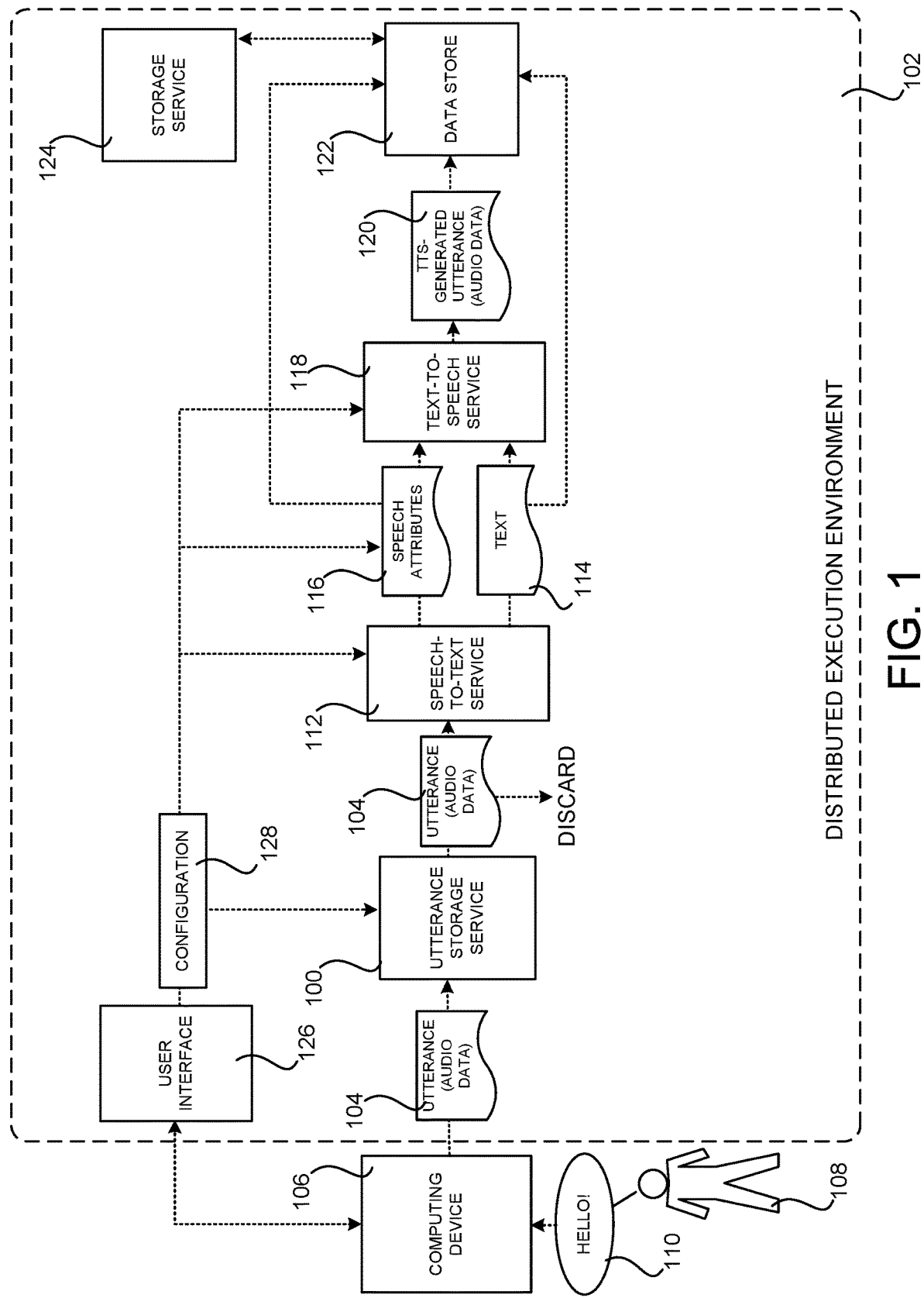
FIG. 1 is a system architecture diagram showing aspects of the configuration and operation of a network service for securely storing utterances, according to one embodiment.

The following detailed description is directed to technologies for securely storing utterances, such as those recorded by a voice-driven computing device. Using the disclosed technologies, utterances can be stored in a secure fashion, while using fewer computing resources than previously required to securely store such utterances. As a result, savings can be realized in the utilization of various types of computing resources such as, but not limited to, processor cycles, memory usage and mass storage usage. Additionally, because computing resources are utilized more efficiently utilizing the technologies disclosed herein, savings in power consumption can also be realized. The disclosed technologies can also provide additional technical benefits not specifically identified herein.

In order to provide the disclosed functionality, a recorded utterance is provided to a speech-to-text ("STT") service that recognizes words in the utterance to translate the utterance to text in one embodiment. The STT service can also identify various speaker-specific attributes of the utterance such as, but not limited to, attributes of the utterance from which personally identifiable information ("PII") of the speaker of the utterance can be derived (e.g. attributes indicating the age or gender of the speaker).

The text (i.e. the recognized words) and the attributes of the utterance are provided to a text-to-speech ("TTS") service that creates speech from the text identified by the STT service and a subset of the attributes, thereby removing at least some of the attributes from which PII can be derived from the utterance. The speech created by the TTS is then stored in a data store that is less secure, and that therefore requires fewer computing resources, than that required for storing the original utterance containing the PII. The original utterance is then discarded by deleting or otherwise disposing of the utterance. In this manner, utterances can be stored in a secure fashion (i.e. without any or limited PII), while using fewer computing resources than required to securely store the original utterance containing the PII.

In one embodiment, the STT service can also translate the speech generated by the TTS service to text. A comparison can then be made between the text generated by the STT service from the speech and the text generated by the STT service from the original utterance. If the text matches, the original utterance can be discarded and the text can be stored. If the text does not match, the original utterance can be retained and the speech generated by the STT service can be discarded. The text recognized in the original utterance can also be stored. Additional details regarding the various components and processes described briefly above for securely storing utterances will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, where tasks can be performed by remote computing devices that are linked through a communications network.

In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a network service 100 for securely storing utterances, according to one embodiment. In the embodiment shown in FIG. 1, an utterance storage service 100 (which might be referred to herein as the "network service 100") implements a processing pipeline for securely storing utterances. In one embodiment, the network service 100 executes in a distributed execution environment 102.

As will be described in detail below, the distributed execution environment 102 provides computing resources for executing various components and network services such as, but not limited to, the network service 100. The computing resources provided by the distributed execution environment 102 can include various types of computing resources, such as data processing resources, data storage resources, networking resources, data communication resources, network services, and the like. Additional details regarding the configuration and operation of an illustrative distributed execution environment 102 will be provided below with regard to FIGS. 6-8.

In the embodiment shown in FIG. 1, the network service 100 implements a processing pipeline that includes a speech-to-text ("STT") service 112, a text-to-speech ("TTS") service 118, and a storage service 124. The network service 100 also operates in conjunction with a computing device 106 in the various embodiments disclosed herein. The computing device 106 is a computing device capable of connecting to the distributed execution environment 102 over a suitable network connection and performing the functionality described below. For example, and without limitation, the computing device 106 can be implemented as a desktop computer, laptop, tablet, network appliance, e-reader, smartphone, video game, set-top box, speech-driven computer, or another type of computing device. The computing device 106 is equipped with an audio input device, such as an audio interface and a microphone, through which the computing device can record digital audio data (which might also be referred to herein as an "utterance 104"), such as speech 110 spoken by a user 108 (who might also be referred to herein as the "speaker 108") of the computing device 106.

The speech 110 uttered by the user 108 can include words (e.g. "search for the term 'new car prices'" or "play songs by U2"). The speech 110 also has various attributes. The attributes include, but are not limited to, the volume of the speech 110, the pitch of the speech 110, the pace or speed of the speech 110, intonation or emotion conveyed by the speech 110, hesitations in the speech 110, and or other attributes. Personally identifiable information ("PII") of the user 108 can be derived from some attributes of the speech 110. For example, and without limitation, the speaker's 108 age, gender, or location can be derived from the attributes of the speech 110. Because the speech 110 can include PII, recordings of the speech 110 are typically stored in a highly secure environment. As discussed above, however, storing such recordings with a high level of security can require significant computing resources, such as processor cycles, memory, and storage space.

In order to address this consideration and potentially others, the mechanism described in detail below removes some or all of the attributes of the speech 110 indicating PII or from which PII can be derived. Consequently, the resulting utterance without the PII can be stored in a less secure location, thereby utilizing fewer computing resources than required by previous solutions. Details regarding this process are provided below.

In order to provide the disclosed functionality, the computing device 106 records an utterance 104 that contains the speech 110 of a user 108. The computing device 106 then provides the utterance 104 to the utterance storage service 100. The utterance storage service 100 then coordinates the secure storage of the utterance 104.

In order to securely store the utterance 104, the utterance storage service 100 first provides the utterance to the STT service 112. The STT service 112 is a network service, or other type of component, that can utilize voice recognition to identify the words in the utterance 104. The STT service 112 can also identify the attributes of the speech 110 in the utterance 104 such as those described above (e.g. volume, pitch, pace, intonation, etc.).

The STT service 112 supplies text 114 describing the words recognized in the utterance 104 to the TTS service 118. The STT service also supplies data identifying the attributes 116 that were detected in the utterance 104 to the TTS service 118. The TTS service 118 is a network service, or other type of component, configured to generate human speech 120 (which might be referred to herein as "audio 120," "audio data 120," or "TTS-generated audio 120") from a text input, such as the text 114 that identifies the words recognized in the utterance 104. The human voice utilized to speak the text 114 can be an actual human voice or a computer-simulated human voice.

The TTS service 118 can also utilize some or all of the attributes 116 to generate the audio 120. For example, and without limitation, the attributes 116 can be utilized to generate speech 120 having a volume level that is the same as that in the original utterance 104. Similarly, the attributes 116 can be utilized to generate speech 120 having a pitch, pace, intonation, hesitations, and/or other attributes that are the same as the original utterance 104. The attributes 116 can also be utilized to generate speech 120 by a human having the same gender or approximate age of the speaker 108 of the original utterance 104. Other attributes 116 can be utilized to generate the audio data 120 in other embodiments.

In some embodiments, the TTS service 118 utilizes only a subset of the attributes 116 of the original utterance 104 to generate the speech 120. In one embodiment, the subset of the attributes 116 used to generate the speech 120 includes only attributes 116 that do not convey PII, attributes from which PII can be derived, or attributes that convey PII in any other way. In this manner, the attributes 116 of the utterance 104 communicating PII can be removed from the speech 120 generated by the TTS service 118.

Because the attributes 116 communicating PII are removed from the speech 120, the speech 120 can be stored in a location, such as a data store 122 provided by a storage service 124, that is less secure than that needed to store the original utterance 104 containing the PII. Because the speech 120 includes limited or no attributes 116 communicating PII, the speech 120 can also be exposed to other network services or components for use in various ways (e.g. for training the STT service 112). The original utterance 104 can also be discarded in some embodiments. For example, and without limitation, the utterance 104 can be securely deleted, removed, or otherwise not stored on a non-volatile storage device. If the utterance 104 is persisted, it is stored in a location having a higher level of security than that utilize to store the speech 120.

In some embodiments, the STT service 112 and/or the TTS service 118 can be configured to remove PII from the text 114. For example, and without limitation, these services can be configured to remove social security numbers, credit card numbers, and/or other types of PII from the text 114. In this manner, PII contained in an utterance 104 will not be reflected in the stored speech 120.

As shown in FIG. 1, the attributes 116 and the text 114 can also be stored in the data store 122. In some embodiments, the attributes 116 and the text 114 are stored separately from one another, and separately from the corresponding audio 120, thereby making it more difficult for an unauthorized user to create speech that includes all of the recognized attributes 116 of the utterance 104. In some embodiments, access to the attributes 116 can be restricted based upon the permission level of the user requesting access to the attributes 116. This restriction can be applied on a per-attribute 116 basis. For example, a first level of permission might be required to access attributes 116 that do not communicate PII (e.g. volume or pitch), while another, higher, level of permission might be required to access attributes 116 that do communicate PII (e.g. age or gender).

In some configurations, the utterance storage service 100, or another component, can provide a user interface ("UI") 126 to the user 108 of the computing device 106 or an administrative user. Through the UI 126, the user 108 can specify a configuration 128 for the operation of the utterance storage service 100. For example, and without limitation, a user 108 can utilize the UI 126 to define those attributes 116 that the STT service 112 is to recognize in the utterance 104. In this way, the user 108 can limit the attributes 116 of the utterance 104 that are recognized by the STT service 112 and provided to the TTS service 118. For instance, the user 108 might indicate that gender, age, or other types of PII are not to be recognized by the STT service 112.

In some embodiments, a user 108 can also utilize the UI 126 to define those attributes 116 that the TTS service 118 is to utilize when generating the audio 120. In this way, the user 108 can limit the attributes 116 of the utterance 104 that are contained in the speech 120 that is generated by the TTS service 118 and stored in the data store 122. For instance, the user 108 might define a subset of the attributes 116 (e.g. gender, age, or other types attributes communicating PII) that are not to be reflected in the speech 120. Other attributes 116 of the original utterance 104 can, however, be utilized to generate the speech 120.

As another example, the user 108 might utilize the UI 126 to indicate that none of the attributes 116 are to be utilized when generating the speech 120 if the attributes 116 indicate that the speaker 108 is a child. Through the UI 126, therefore, the user 108 can specify those attributes 116 that are to be (or are not to be) recognized in an utterance 104, and those attributes 116 that are to be (or are not to be) utilized to generate speech 120 from the text 114 of the utterance 104. The UI 126 can also provide functionality for allowing a user 108 to specify whether utterances 104 are to be stored or deleted and, if so, under what conditions.

It is to be appreciated that the process described above can be performed synchronously as utterances 104 are received or asynchronously in an off-line batch mode in various embodiments. Additional details regarding the various network services described above will be provided below with regard to FIG. 2.

Figure 2:
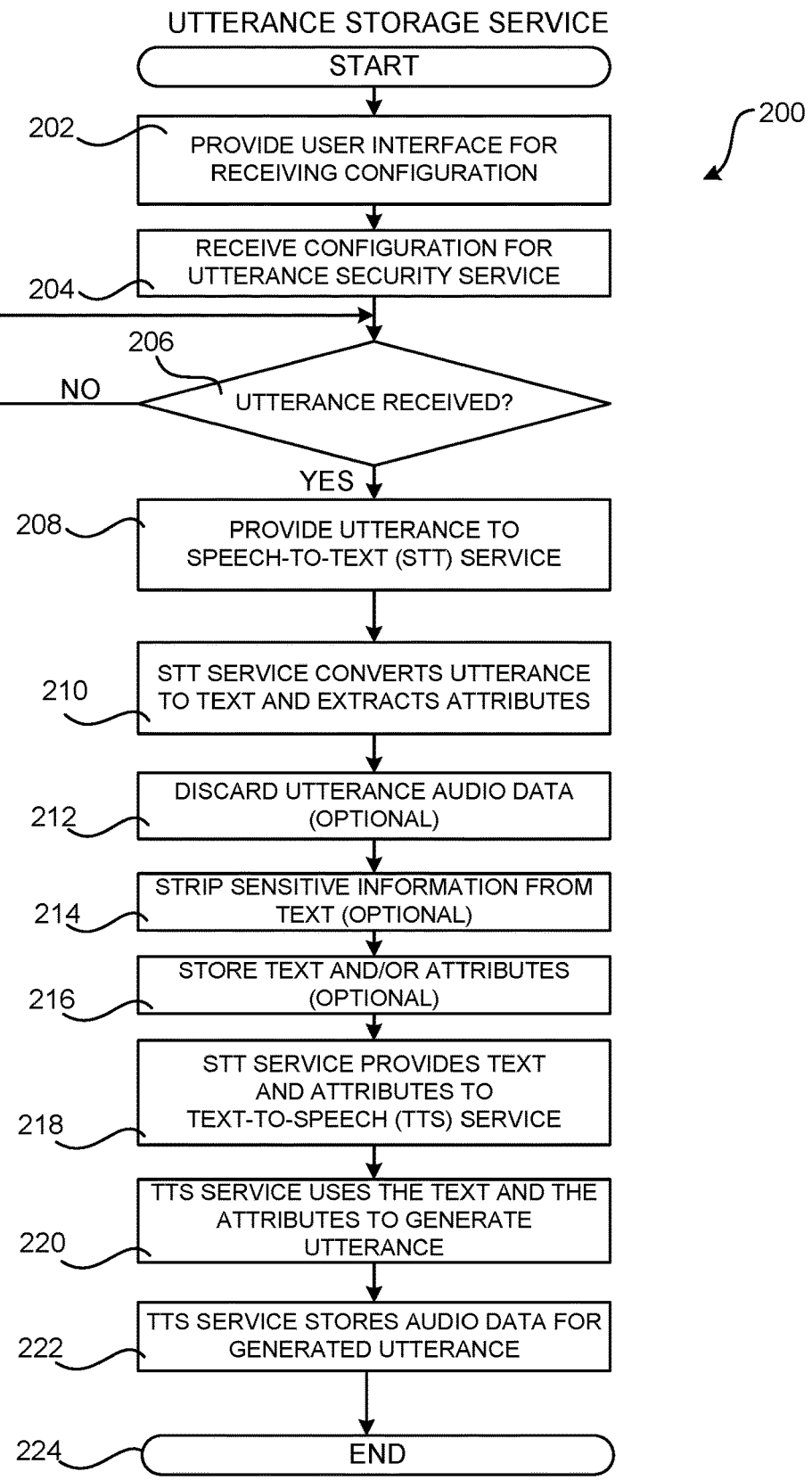
FIG. 2 is a flow diagram showing a routine that illustrates further aspects of the network service of FIG. 1 for securely storing utterances, according to one embodiment.

FIG. 2 is a flow diagram showing a routine 200 that illustrates further aspects of the network service 100 of FIG. 1 for securely storing utterances 104, according to one embodiment. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within a processor, such as the processor 500 described below with regard to FIG. 5.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where a UI 126 can be provided for allowing a user 108 to configure aspects of the operation of the utterance storage service 100. A configuration 128 can be received through the UI 126 at operation 204 before or during processing of utterances. For example, and as discussed above, a user 108 can utilize the UI 126 to define those attributes 116 that the STT service 112 is to recognize (or not recognize) in the utterance 104. A user 108 can also utilize the UI 126 to define those attributes 116 that the TTS service 118 is to utilize (or is not to utilize) when generating the audio 120. Other types of configuration options for the utterance storage service 100 can also be configured in the UI 126.

From operation 204, the routine 200 proceeds to operation 206. At operation 206, the utterance storage service 100 determines whether an utterance 104 has been received from a computing device 106. If an utterance 104 has been received, the routine 200 proceeds from operation 206 to operation 208. At operation 208, the utterance storage service 100 provides the received utterance 104 to the STT service 112. The routine 200 then proceeds from operation 208 to operation 210.

At operation 210, the STT service 112 performs speech recognition on the utterance 104 to identify the words contained therein. The STT service 112 can then generate text 114 containing the recognized words. The STT service 112 can also identify the attributes 116 of the speech in the utterance 104 at operation 210. As discussed above, the configuration 128 might specify those attributes 116 that the STT service 112 is to recognize (or not to recognize). From operation 210, the routine 200 proceeds to operation 212.

At operation 212, the utterance 104 is discarded in some embodiments. The utterance 104 can be deleted or otherwise removed from a persistent storage device. The UI 126 can be utilized to configure whether the utterance 104 is to be discarded in some embodiments. The routine 200 then proceeds from operation 212 to operation 214.

At operation 214, PII and/or other types of sensitive or undesirable information can be stripped from the text 114. In some embodiments, a user 108 can utilize the UI 126 to specify the types of material that is to be removed from the text 114. In some embodiments, the material is not stripped from the text 114, but rather is encrypted, tokenized, or otherwise rendered unreadable and unspeakable. In these embodiments, access to the material can be made at a future time if necessary, for instance by decrypting the material. From operation 214, the routine 200 proceeds to operation 216.

At operation 216, the text 114 and/or the attributes 116 can be stored, such as on the data store 122. As discussed above, the text 114 and the attributes 116 can be stored separately from one another and from the corresponding speech 120. The attributes 116 can be stored in a location with a higher level of security than the speech 120. Access to the attributes 116 can also be permitted based upon the access rights of a requesting user.

From operation 216, the routine 200 proceeds to operation 218, where the STT service 112 provides the text 114 and the attributes 116 to the TTS service 118. The TTS service 118 then utilizes the text 114 and zero or more of the attributes 116 to generate the speech 120 at operation 220. As discussed above, a user 108 can define a configuration 128 specifying which, if any, of the attributes 116 are to be utilized to generate the speech 120. In this manner, a user 108 can define a subset of the attributes 116 (e.g. those attributes not communicating PII) that are to be used to generate the speech 120.

From operation 220, the routine 200 proceeds to operation 222, where the TTS service 118 stores the speech 120, such as on the data store 122 provided by the storage service 124. As discussed above, the speech 120 can be stored in a location having a lower security level than that utilized to store the utterance 104 since the speech 120 has some or all of the attributes 116 removed. From operation 222, the routine 200 proceeds to operation 224, where it ends. Additional utterances 104 can be processed in the manner described above As also discussed above, the speech 120, the text 114, and/or the attributes 116 can be exposed to other network services in some embodiments. For example, text 114 and corresponding speech 120 with PII removed can be exposed to the STT service 112 for use in training purposes.

Figure 3:
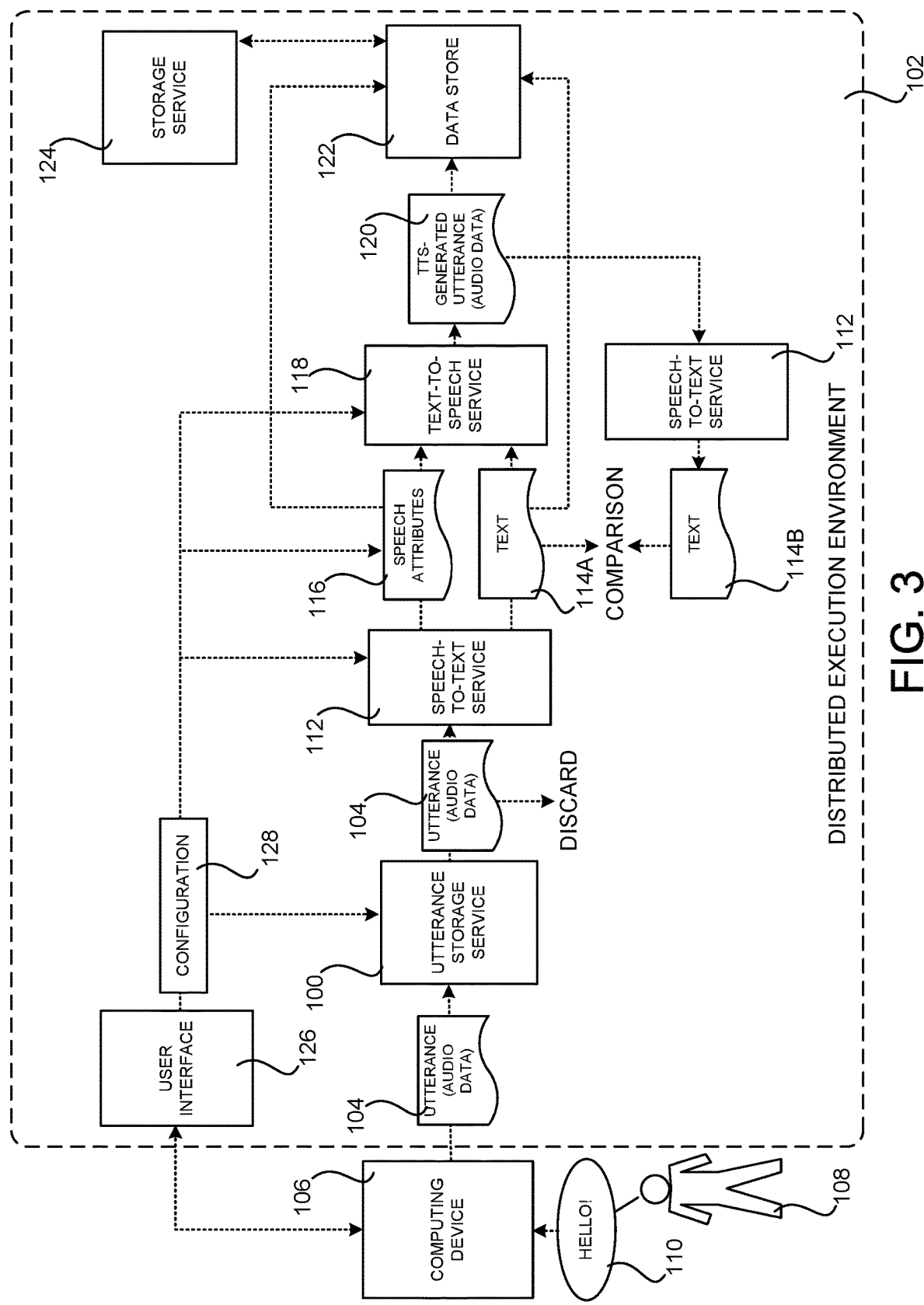
FIG. 3 is a system architecture diagram that illustrates another example embodiment of the network service of FIG. 1 for securely storing utterances.

FIG. 3 is a system architecture diagram that illustrates another example embodiment of the network service 100 of FIG. 1 for securely storing utterances. In this embodiment, the utterance storage service 100, or another component, is configured to provide the speech 120 generated by the TTS service 118 from text 114A to the STT service 112. In turn, the STT service 122 performs speech recognition on the speech 120 to identify the words (i.e. the text 114B) contained therein.

The utterance storage service 100, or another component, then compares the text 114A to the text 114B. If the text 114A and 114B match, the original utterance 104 can be discarded. Additionally, the speech 120 can be stored in some configurations based upon a user preference.

If the text 114A and 114B do not match, the utterance 104 can be stored, and the speech 120 can be discarded. Additionally, the text 114A generated from the utterance 104 can be stored. Additional details regarding this process will be provided below with regard to FIG. 4.

Figure 4:
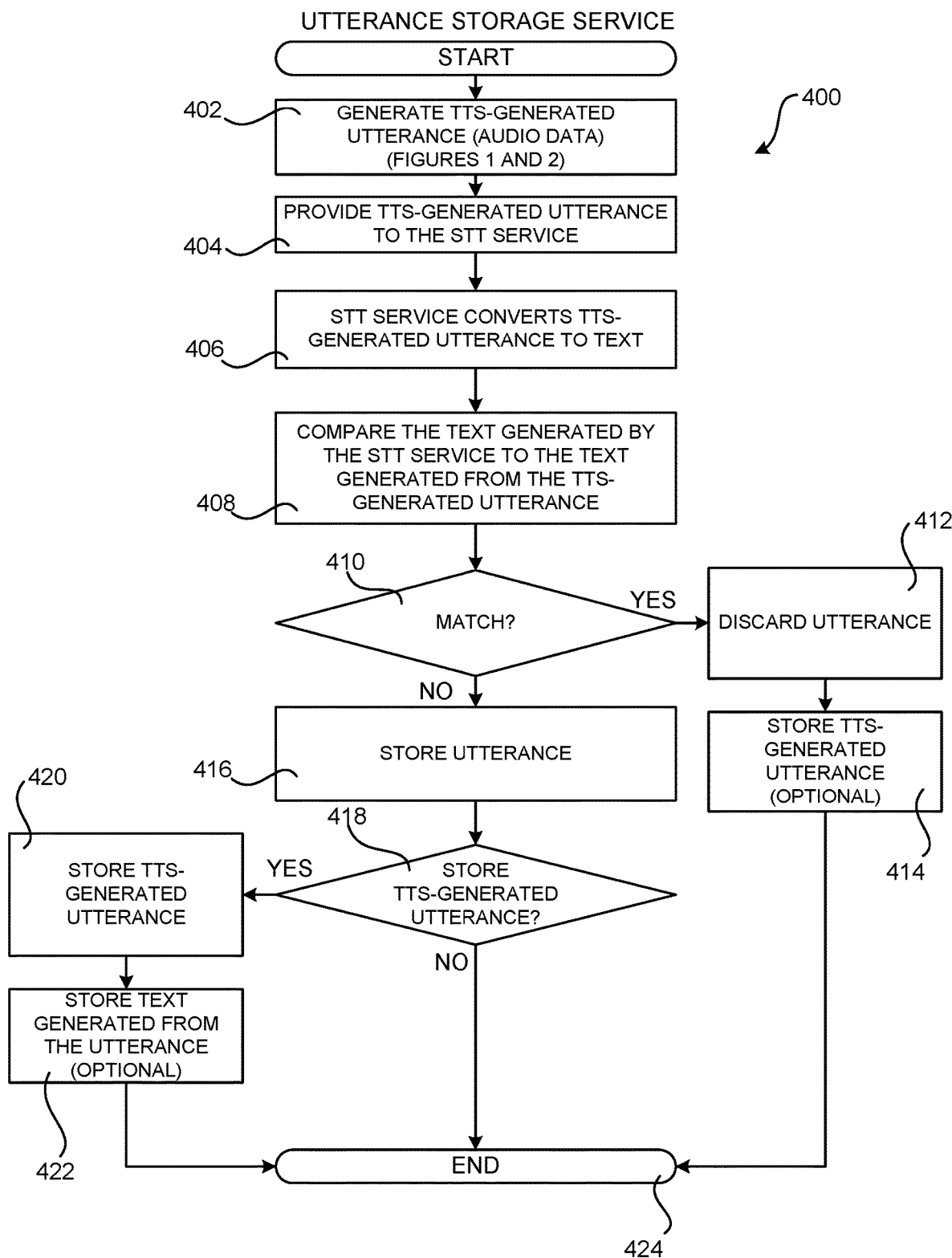
FIG. 4 is a flow diagram showing a routine that illustrates further aspects of the network service of FIG. 3 for securely storing utterances, according to one embodiment.

FIG. 4 is a flow diagram showing a routine 400 that illustrates further aspects of the network service 100 of FIG. 3 for securely storing utterances, according to one embodiment. The routine 400 begins at operation 402, where the speech 120 is generated in the manner described above with regard to FIGS. 1 and 2. The routine 400 then proceeds to operation 404, where the speech 120 is provided to the STT service 112.

From operation 404, the routine 400 proceeds to operation 406, where the STT service 112 converts the TTS-generated audio 120 to text 114B. The routine 400 then proceeds to operation 408, where the utterance storage service 100, or another component, compares the text 114B to the text 114A generated from the original utterance 104. The routine 400 then proceeds from operation 408 to operation 410.

At operation 410, the utterance storage service 100, or another component, determines if the text 114A and the text 114B are the same (i.e. match). If the text 114A and the text 114B match, the routine 400 proceeds from operation 410 to operation 412, where the original utterance 104 is discarded (e.g. deleted from a persistent storage device). The routine 400 then proceeds to operation 414, where the speech 120 can be stored. The routine 400 then proceeds from operation 414 to operation 424, where it ends.

If, at operation 410, the utterance storage service 100, or another component, determines that the text 114A and the text 114B do not match, the routine 400 proceeds from operation 410 to operation 416, where the utterance storage service 100, or another component, determines whether the speech 120 is to be stored. In some embodiments, the UI 126 can be utilized to define a configuration 128 indicating whether the speech 120 is to be stored when the text 114A does not match the text 114B. If the utterance 104 is not to be stored, the routine 400 proceeds from operation 418 to operation 424, where it ends.

If the speech 120 is to be stored, the routine 400 proceeds from operation 418 to operation 420, where the speech 120 is stored, such as in the data store 122. The routine 400 then proceeds from operation 420 to operation 422, where the text 114A might also be stored depending upon user preference. The routine 400 then proceeds from operation 422 to operation 424, where it ends.

Figure 5:
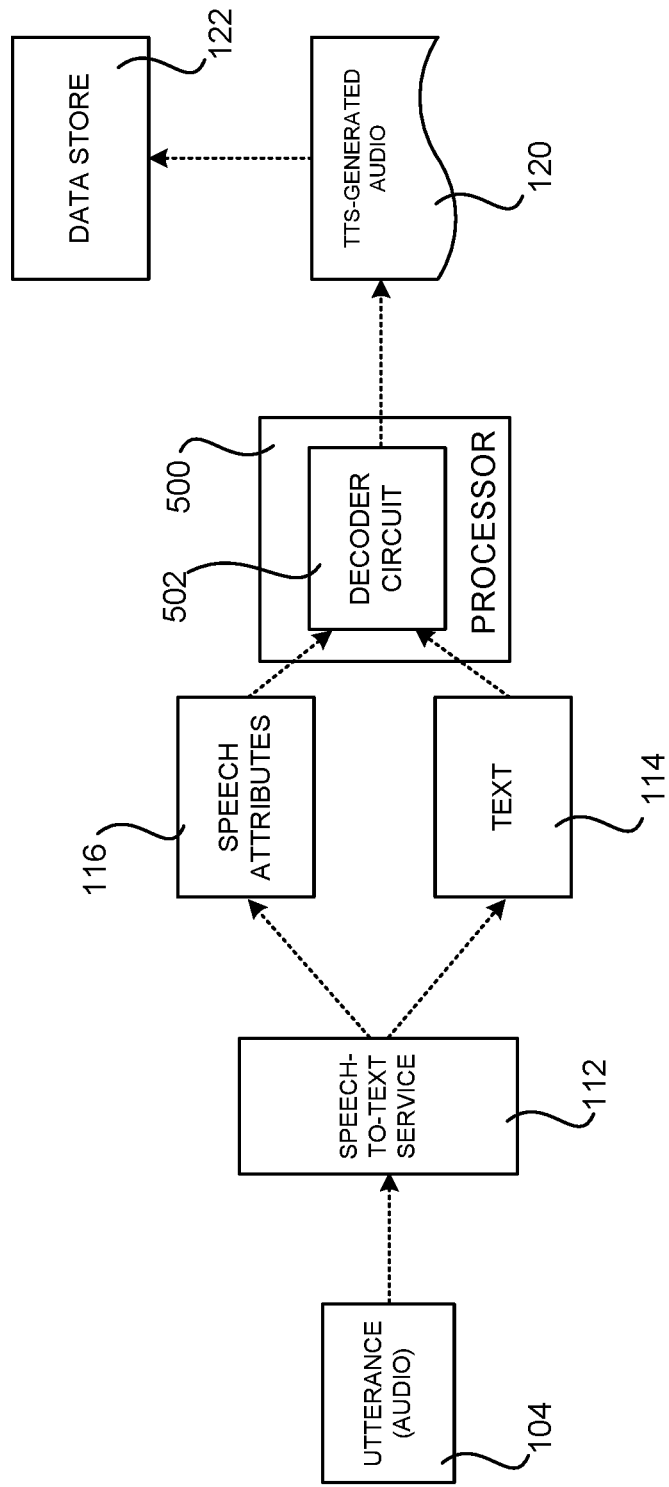
FIG. 5 is a system architecture diagram illustrating aspects of the configuration and operation of a processor configured for securely storing utterances, according to one embodiment.

FIG. 5 is a system architecture diagram illustrating aspects of the configuration and operation of a processor configured for securely storing utterances, according to one embodiment. As illustrated in FIG. 5, the processor 500 includes a decoder circuit 502 that is configured to decode instructions to securely store utterances 104 in the manner described above.

The instructions decoded by the decoder circuit can be general purpose instructions or function-specific instructions that receive speech attributes 116 and text 114 for an utterance 104 from the STT service 112. When the decoder circuit 502 is configured to decode function-specific instructions, the decoder circuit 502 can also be specific to those instructions in order to decode specific instruction fields included in x86, ARM, MIPS, or other architectures, such as an opcode, one or more data fields (immediate or addresses to data) and the like. Other processor configurations can be utilized to implement the functionality described above in other embodiments. The decoder circuit 502 can output the audio 120, and store the audio 120 in an appropriate data store 122 in the manner described above.

Figure 6:
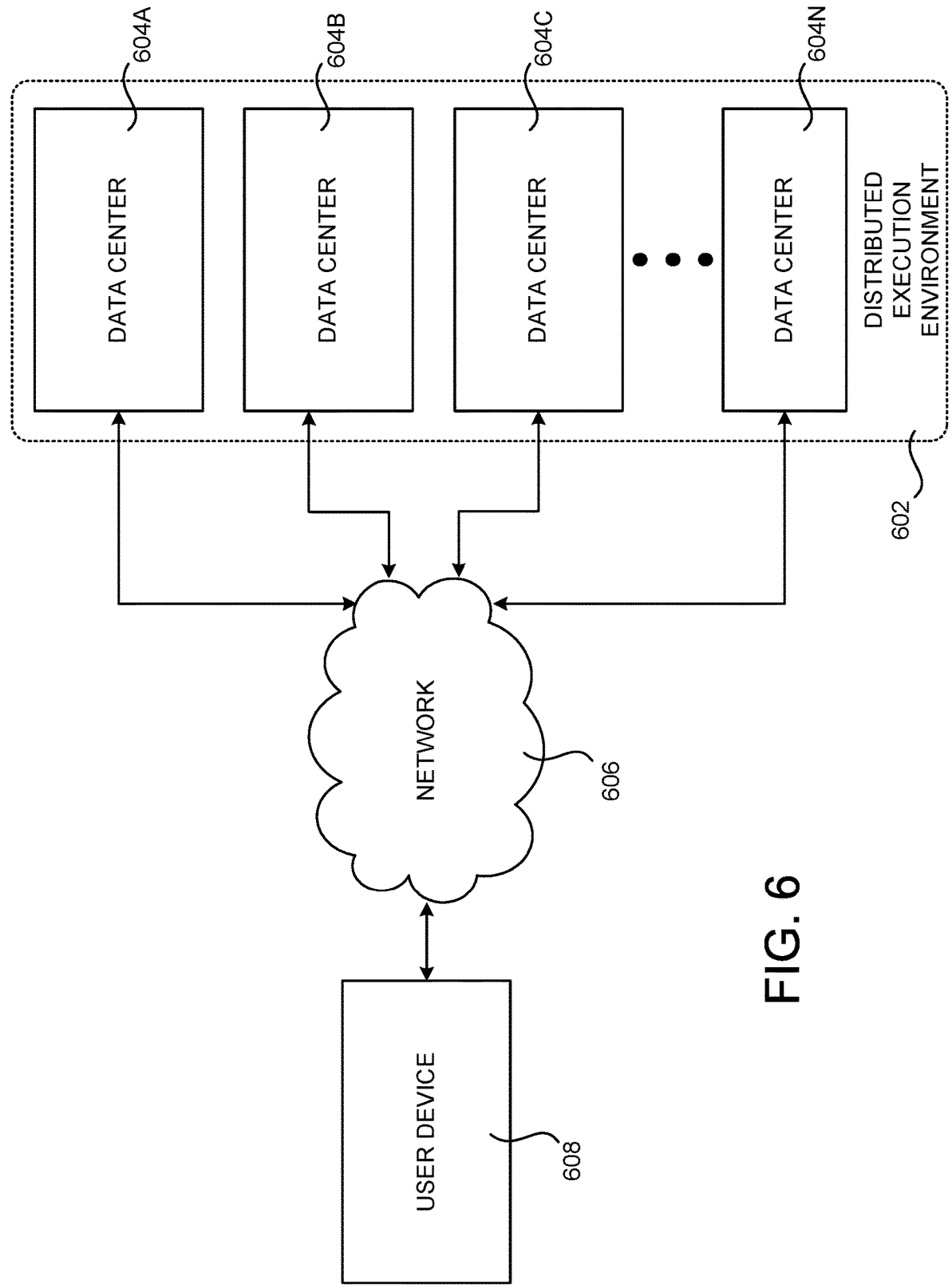
FIG. 6 is a computing system diagram that illustrates a configuration for a distributed execution environment that can be utilized to implement aspects of the technologies disclosed herein.

FIG. 6 is a system and network diagram that shows aspects of a distributed execution environment 602 that can provide computing resources for implementing the various technologies disclosed herein including, but not limited to, the distributed execution environment 102, the utterance security service 100, the STT service 112, and the TTS service 118, each of which was described in detail above. The computing resources provided by the distributed execution environment 602 can include various types of computing resources, such as data processing resources, data storage resources, networking resources, data communication resources, network services, and the like.

Each type of computing resource provided by the distributed execution environment 602 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services described herein, and/or other types of programs. Data storage resources can include file storage devices, block storage devices, and the like. The distributed execution environment 602 can also be configured to provide other types of resources and network services.

The computing resources provided by the distributed execution environment 602 are enabled in one implementation by one or more data centers 604A-604N (which might be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that implements some of the technologies disclosed herein will be described below with regard to FIG. 7.

Users of the distributed execution environment 602, such as a user of the computing device 106, can access the various resources provided by the distributed execution environment 602 over a network 606, which can be a wide area communication network ("WAN"), such as the Internet, an intranet or an Internet service provider ("ISP") network or a combination of such networks. For example, and without limitation, a user computing device 608 can be utilized to access the distributed execution environment 602 by way of the network 606. It should be appreciated that a local-area network ("LAN"), the Internet, or any other networking topology known in the art that connects the data centers 604 to remote computers can also be utilized. It should also be appreciated that combinations of such networks can also be utilized.

Figure 7:
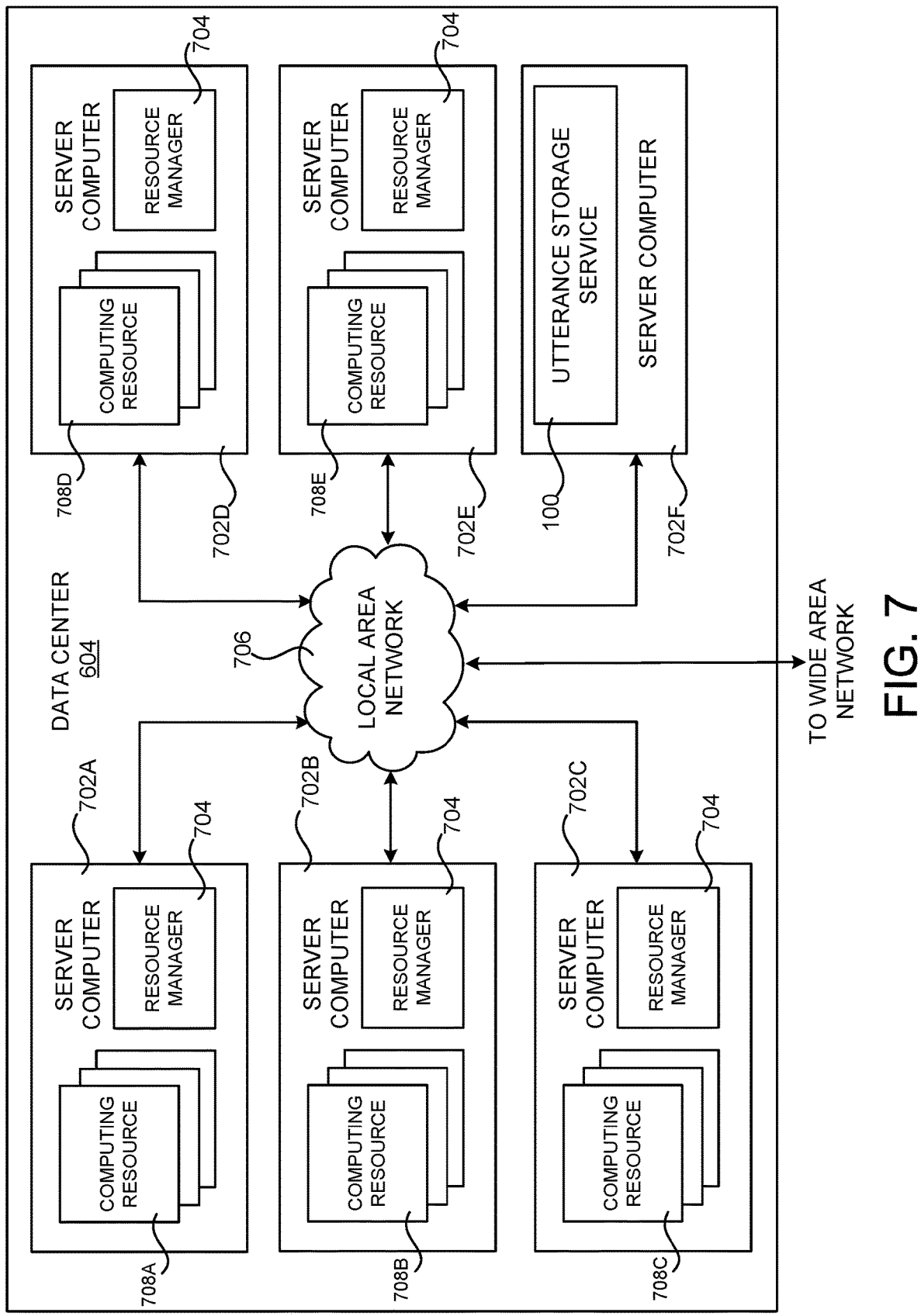
FIG. 7 is a computing system diagram that illustrates aspects of the configuration for a data center that can be utilized to implement aspects of the technologies disclosed herein.

FIG. 7 is a computing system diagram that illustrates one configuration for a data center 604 that can be utilized to implement the technologies disclosed herein. The example data center 604 shown in FIG. 7 includes several server computers 702A-702F (which might be referred to herein singularly as "a server computer 702" or in the plural as "the server computers 702") for providing computing resources 708A-708E.

The server computers 702 can be standard tower, rackmount, or blade server computers configured appropriately for providing the computing resources 708. As mentioned above, the computing resources 708 can be data processing resources such as virtual machine instances or hardware computing systems, data storage resources, database resources, networking resources, and others. Some of the servers 702 can also be configured to execute a resource manager 704 capable of instantiating and/or managing the computing resources 708. In the case of virtual machine instances, for example, the resource manager 704 can be a hypervisor or another type of program configured to enable the execution of multiple virtual machine instances on a single server 702. Server computers 702 in the data center 704 can also be configured to provide network services and other types of services for supporting provision of the components of the utterance security service 100, the STT service 112, and the TTS service 118, and the related functionality described herein.

The data center 704 shown in FIG. 7 also includes a server computer 702F that can execute some or all of the software components described above. For example, and without limitation, the server computer 702F can be configured to execute software components for providing the utterance security service 100. The server computer 702F can also be configured to execute other components and/or to store data for providing some or all of the functionality described herein. In this regard, it should be appreciated that the software components illustrated in FIG. 7 as executing on the server computer 702F can execute on many other physical or virtual servers in the data centers 704 in various embodiments.

In the example data center 704 shown in FIG. 7, an appropriate LAN 706 is also utilized to interconnect the server computers 702A-702F. The LAN 706 is also connected to the network 606 illustrated in FIG. 6. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 704A-704N, between each of the server computers 702A-702F in each data center 704 and, potentially, between computing resources 708 in each of the data centers 704. It should also be appreciated that the configuration of the data center 604 described with reference to FIG. 7 is merely illustrative and that other implementations can be utilized.

Figure 8:
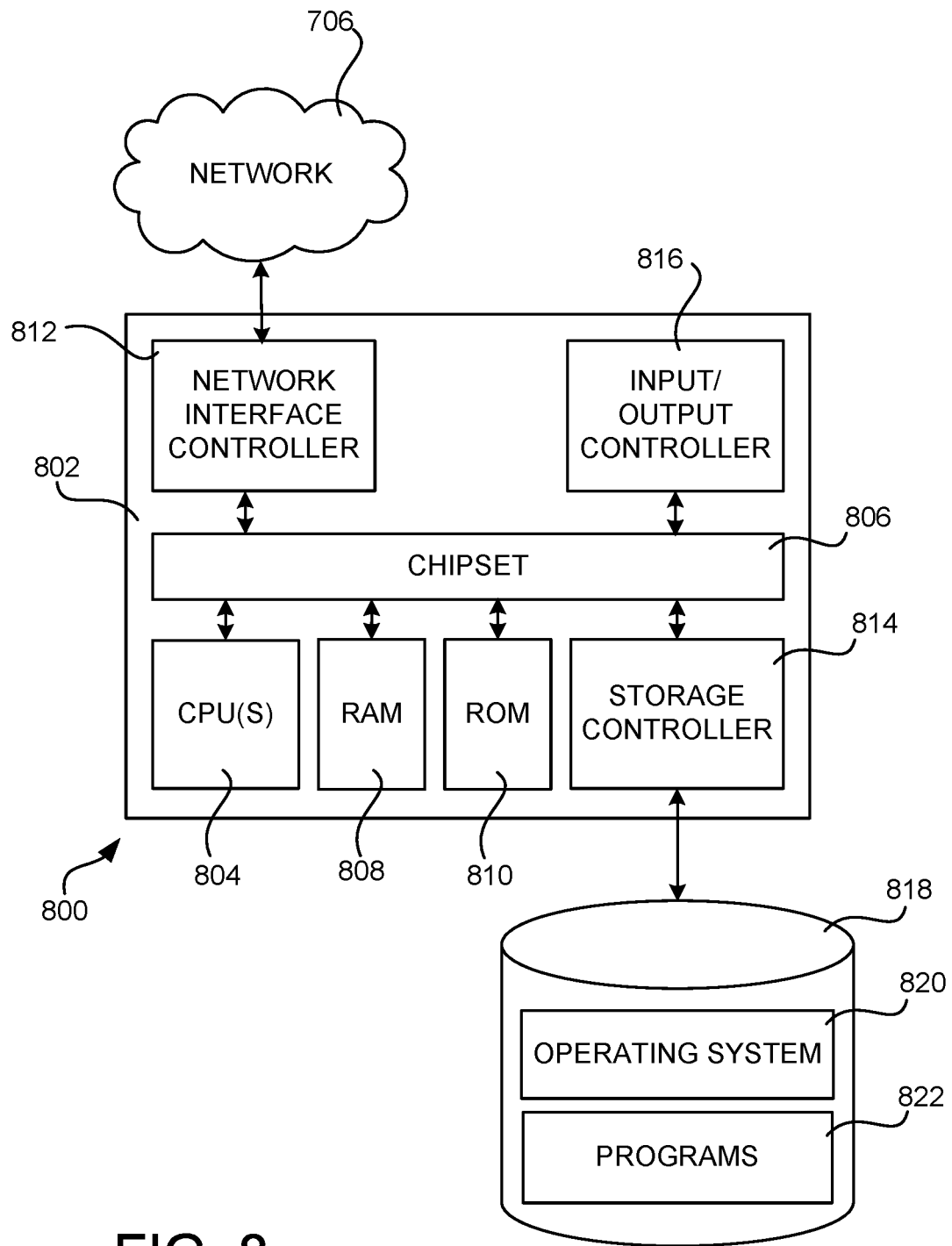
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing various aspects of the functionality described herein. The computer architecture shown in FIG. 8 illustrates a conventional server computer, workstation, desktop computer, laptop, tablet, network appliance, e-reader, smartphone, or other computing device, and can be utilized to execute any of the software components presented herein. For example, the computer architecture shown in FIG. 8 can be utilized to execute software components for providing the utterance security service 100, and the related functionality described herein. The computer architecture shown in FIG. 8 can also be utilized to implement the computing device 106.

The computer 800 includes a baseboard 802, or "motherboard," which is a printed circuit board to which a multitude of components or devices can be connected by way of a system bus or other electrical communication paths. In one illustrative embodiment, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the embodiments described herein.

The computer 800 can operate in a networked environment using logical connections to remote computing devices and computer systems through a network, such as the network 806. The chipset 806 can include functionality for providing network connectivity through a NIC 812, such as a gigabit Ethernet adapter. The NIC 812 is capable of connecting the computer 800 to other computing devices over the network 706. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. In one embodiment, the operating system 820 is the LINUX operating system. In another embodiment, the operating system 820 is the WINDOWS SERVER operating system from MICROSOFT CORPORATION. In other embodiments, the UNIX operating system or one of its variants can be utilized as the operating system 820. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800 and executed, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described herein. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

It should be appreciated that technologies for securely storing utterances have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. An apparatus, comprising:
    at least one non-transitory computer-readable storage medium to store instructions which, in response to being performed by one or more processors, cause the apparatus to:
        receive first audio data comprising a first utterance of one or more first words, the first audio data having a plurality of attributes and being authorized to be stored in a first storage location;
        perform speech recognition on the first audio data to identify the one or more first words;
        perform speech recognition on the first audio data to identify the plurality of attributes;
        determine, from the plurality of attributes, a subset of the plurality of attributes identified from the first audio data;
        generate second audio data using at least the one or more first words and the subset of the plurality of attributes, the second audio data comprising a second utterance of the one or more first words;
        perform speech recognition on the second audio data to identify one or more second words;
        compare the one or more first words to the one or more second words; and
        if the one or more first words match the one or more second words, discard the first audio data and store the second audio data in a second storage location; and
        if the one or more first words do not match the one or more second words, discard the second audio data and store the first audio data in the first storage location.

2. The apparatus of claim 1, wherein the subset of the plurality of attributes comprises attributes that do not provide personally identifiable information associated with a speaker of the first utterance.

3. The apparatus of claim 1, wherein the at least one non-transitory computer-readable storage medium to store further instructions which, in response to being performed by the one or more processors, cause the apparatus to provide a user interface for defining the subset of the plurality of attributes or for defining the plurality of attributes that are to be identified in the first audio data.

4. The apparatus of claim 1, wherein the at least one non-transitory computer-readable storage medium to store further instructions which, in response to being performed by the one or more processors, cause the apparatus to provide a user interface for specifying whether the first audio data is to be stored or deleted.

5. The apparatus of claim 1, wherein:
    the plurality of attributes include first attributes that are associated with a first security level;
    the subset of the first plurality of attributes include second attributes that are associated with a second security level that is less than the first security level; and
    the second audio data is associated with a second plurality of attributes that include third attributes that are associated with the second security level.

6. The apparatus of claim 2, wherein:
    the at least one non-transitory computer-readable storage medium to store further instructions which, in response to being performed by the one or more processors, cause the apparatus to further generate the second audio based at least on one or more selected attributes, the one or more first words, and the subset of the plurality of attributes; and
    the plurality of attributes includes the one or more selected attributes and the subset of the plurality of attributes.

7. The apparatus of claim 5, wherein the second audio data is authorized to be stored in a second storage location that is associated with the second security level.

8. A system comprising:
    one or more processors; and
    one or more computer-executable instructions stored in memory and executable by the one or more processors to:
        cause a speech-to-text service to perform speech recognition on first audio data to:
            identify one or more first words; and
            identify a plurality of attributes in the first audio data, the first audio data being authorized to be stored in a storage location;
        determining, from the plurality of attributes, a subset of the plurality of attributes associated with the first audio data;
        cause a text-to-speech service to generate second audio data using at least the one or more first words and the subset of the plurality of attributes;
        cause speech recognition to be performed on the second audio data to identify one or more second words;
        cause the one or more first words to be compared to the one or more second words; and
        if the one or more first words match the one or more second words, cause the first audio data to be discarded and cause the second audio data to be stored; and
        if the one or more first words do not match the one or more second words, cause the second audio data to be discarded and cause the first audio data to be stored.

9. The processor of claim 8, wherein the subset of the plurality of attributes comprises attributes that do not provide personally identifiable information of a speaker associated with the first audio data.

10. The processor of claim 8, wherein the one or more computer-executable instructions are further executable by the one or more processors to provide a user interface for defining the subset of the plurality of attributes.

11. The processor of claim 8, wherein the one or more computer-executable instructions are further executable by the one or more processors to cause a user interface to be provided for specifying whether the first audio data is to be stored or deleted.

12. The processor of claim 8, wherein the one or more computer-executable instructions are further executable by the one or more processors to receive an indication, via a user interface, of one or more selected attributes that are to be included in the subset of the first plurality of attributes.

13. The processor of claim 8, wherein the one or more computer-executable instructions are further executable by the one or more processors to:
cause the speech-to-text service to identify, from the one or more first words, at least a word that includes personally identifiable information and one or more second words that do not include the personally identifiable information; and
wherein the text-to-speech service generates the second audio data based at least on the one or more second words and the subset of the first plurality of attributes.

14. The processor of claim 8, wherein the storage location is associated with a first security level, and wherein the second audio data is authorized to be stored in a second storage location that is associated with a second security level that is less than the first security level.

15. A computer-implemented method, comprising:
causing speech recognition to be performed on first audio data to identify one or more first words and a plurality of attributes in the first audio data, the first audio data being authorized to be stored in a storage location;
determining, from the plurality of attributes, a subset of the first plurality of attributes associated with the first audio data;
causing second audio data to be generated using at least the one or more first words and the subset of the plurality of attributes;
causing speech recognition to be performed on the second audio data to identify one or more second words;
causing the one or more first words to be compared to the one or more second words; and
if the one or more first words match the one or more second words, causing the first audio data to be discarded and causing the second audio data to be stored; and
if the one or more first words do not match the one or more second words, causing the second audio data to be discarded and causing the first audio data to be stored.

16. The computer-implemented method of claim 15, wherein the subset of the plurality of attributes comprises second attributes that do not provide personally identifiable information of the speaker associated with the first audio data.

17. The computer-implemented method of claim 15, further comprising providing a user interface for defining the subset of the plurality of attributes.

18. The computer-implemented method of claim 15, wherein the first audio data is associated with a speaker and the plurality of attributes are associated with a first voice of the speaker.

19. The computer-implemented method of claim 18, wherein the second audio data includes a second plurality of attributes that are associated with a second voice that is different than the first voice of the speaker.

20. The computer-implemented method of claim 15, wherein the storage location is associated with a first security level, and wherein the second audio data is authorized to be stored in a second storage location that is associated with a second security level that is less than the first security level.

* * * * *